United States Patent
Huang et al.

(10) Patent No.: US 9,227,223 B2
(45) Date of Patent: Jan. 5, 2016

(54) METHOD FOR PREPARING THE MATTE ANTI-FINGERPRINT STAINLESS STEEL DECORATIVE PLATE

(71) Applicant: HAIMEN SENDA DECORATION MATERIAL CO., LTD, Nantong (CN)

(72) Inventors: Lixin Huang, Nantong (CN); Liang Hong, Nantong (CN); Zhihong Sang, Nantong (CN); Gang Chen, Nantong (CN); Hui Jiang, Nantong (CN)

(73) Assignee: HAIMEN SENDA DECORATION MATERIAL CO., LTD, Nantong (CN)

( * ) Notice: Subject to any disclaimer, the term of this patent is extended or adjusted under 35 U.S.C. 154(b) by 0 days.

(21) Appl. No.: 14/548,847

(22) Filed: Nov. 20, 2014

(65) Prior Publication Data
US 2015/0267072 A1   Sep. 24, 2015

(30) Foreign Application Priority Data

Mar. 18, 2014   (CN) .......................... 2014 1 0100467

(51) Int. Cl.
| | |
|---|---|
| *B05D 5/08* | (2006.01) |
| *C09D 133/08* | (2006.01) |
| *B05D 5/06* | (2006.01) |
| *B05D 7/16* | (2006.01) |
| *B05D 1/02* | (2006.01) |
| *B08B 17/06* | (2006.01) |
| *B05D 3/00* | (2006.01) |
| *B05D 3/02* | (2006.01) |
| *B44C 1/00* | (2006.01) |

(52) U.S. Cl.
CPC .. *B05D 5/08* (2013.01); *B05D 5/06* (2013.01); *B05D 7/16* (2013.01); *C09D 133/08* (2013.01); *B05D 1/02* (2013.01); *B05D 3/002* (2013.01); *B05D 3/0272* (2013.01); *B05D 2202/15* (2013.01); *B08B 17/06* (2013.01); *B44C 1/00* (2013.01)

(58) Field of Classification Search
None
See application file for complete search history.

(56) References Cited

U.S. PATENT DOCUMENTS

| 4,330,576 A | * | 5/1982 | Dodd | B05D 3/04 30/346.53 |
|---|---|---|---|---|
| 2003/0029146 A1 | * | 2/2003 | Quigley | B01D 46/005 55/497 |
| 2010/0216929 A1 | * | 8/2010 | Jung | C09D 5/00 524/413 |
| 2011/0129665 A1 | * | 6/2011 | Botelho | C03C 17/30 428/336 |
| 2012/0204429 A1 | * | 8/2012 | Vlachos | B05B 7/0815 30/346.5 |

FOREIGN PATENT DOCUMENTS

| CN | 101386006 A | * | 3/2009 | |
|---|---|---|---|---|
| CN | 101939162 A | * | 1/2011 | ............... B05D 5/06 |
| CN | 200980104205 | | 1/2011 | |
| CN | 102602079 A | * | 7/2012 | |
| CN | 201210063840.3 | | 7/2012 | |

OTHER PUBLICATIONS

English translation of CN 102602079; Jul. 2012.*
CN 101386006 A—Abstract—Mar. 2009.*

* cited by examiner

*Primary Examiner* — Timothy Meeks
*Assistant Examiner* — Michael P Rodriguez
(74) *Attorney, Agent, or Firm* — Treasure IP Group, LLC

(57) ABSTRACT

The present invention provides a method for preparing a matte anti-fingerprint stainless steel decorative plate. The method comprises the steps of: 1) selecting a polymer coating material, wherein the polymer coating material is formed by mixing a film forming material, an inorganic nano-filler, a solvent and an auxiliary agent, wherein the film forming material comprises the following ingredients based on the weight ratio: 30-50 parts of acrylate composite resin, 5-20 parts of amino resin, and 5-15 parts of epoxy resin; and 1-8 parts of a matting agent and 1-8 parts of an anti-settling agent are added; and 2) performing a spray coating using the polymer coating material, wherein a coating film has a thickness of 1.5-2.5 μm, the precision of the atomization air pressure of a spray gun is controlled at ±0.1 bar during spray coating, and the coating is dried to obtain a finished product and then a matte anti-fingerprint stainless steel decorative plate which has a high-standard matte and anti-fingerprint index is prepared.

3 Claims, No Drawings

METHOD FOR PREPARING THE MATTE ANTI-FINGERPRINT STAINLESS STEEL DECORATIVE PLATE

CROSS REFERENCE TO RELATED APPLICATION

This application claims priority to Chinese Application No. 2014101004673, filed on Mar. 18, 2014. The Chinese Application is incorporated herein by reference in its entirety.

I. FIELD OF THE INVENTION

The invention relates to a method for preparing a coated stainless steel decorative plate, and particularly to the preparation of a matte anti-fingerprint stainless steel decorative plate.

II. BACKGROUND OF THE INVENTION

A stainless steel decorative plate is a very important product in such industries as elevators, automobiles, household appliances, furniture, kitchenware and decoration. With the ever-increasing requirements of all industries on stainless steel decorative plates, common anti-fingerprint stainless steel decorative plates have exposed some disadvantages, including excessively high brightness which is likely to cause visual fatigue. For the preparation of a matte anti-fingerprint stainless steel decorative plate, the matte anti-fingerprint stainless steel decorative plate is initially trial-manufactured, which reduces light pollution and provides the characteristics of high hardness, good abrasion resistance and high corrosion prevention, especially better process conditions such as salt fog resistance to suit the market demand.

Patent Application CN201210063840.3 filed by the applicant relates to a coated anti-stain and anti-fingerprint stainless steel material which consists of a stainless steel plate and a polymer coating material, wherein the stainless steel plate comprises austenitic stainless steel and low-nickel or nickel-free ferritic stainless steel, and the polymer coating material thereof is formed by mixing acrylic resin, a film forming material, an inorganic nano-filler, a solvent and an auxiliary agent. However, a matte anti-fingerprint stainless steel decorative plate cannot be prepared by a common process.

Chinese Patent Application 200980104205 relates to a colored clear coated stainless steel plate which comprises a stainless steel substrate and a colored clear coating film formed on at least a single side of the stainless steel substrate, wherein the colored clear coating film contains a pigment having an average primary particle size of 10 to 1,100 nm and the pigment volume concentration is 0.5-5.0%.

III. SUMMARY OF THE INVENTION

An object of the invention is to provide a method for preparing a matte anti-fingerprint stainless steel decorative plate which has a high-standard matte and anti-fingerprint index.

The invention adopts the following technical solution: the method for preparing the matte anti-fingerprint stainless steel decorative plate comprises the steps of: 1) selecting a polymer coating material, wherein the polymer coating material is formed by mixing acrylic resin, a film forming material, an inorganic nano-filler, a solvent and an auxiliary agent; the film forming material comprises the following ingredients based on the weight ratio: 30-50 parts of acrylate composite resin, 5-20 parts of amino resin, 5-15 parts of epoxy resin, 1-5 parts of an inorganic nano-filler, 40-50 parts of a solvent and 10-20 parts of an auxiliary agent; and 1-8 parts of a matting agent and 1-8 parts of an anti-settling agent are added; and 2) performing spray coating on a polymer coating, wherein a coating film has a thickness of 1.5-2.5 μm, the precision of the atomization air pressure of a spray gun is controlled at ±0.1 bar during spray coating, and the coating is dried to obtain a finished product.

Further, pretreatment before spray coating: the stainless steel plate is washed by a neutral detergent, subjected to ultrasonic rinsing with deionized water, and dried with hot air in a clean environment.

The invention has the beneficial effect that the product quality of the invention fully meets high-standard technical requirements. There is no precedent or report; and for the quality inspection of the matte anti-fingerprint stainless steel decorative plate, the brightness is measured by a gloss meter.

The main technical performance indices are as follows:

1.1. raw materials comply with the provisions of corresponding standards;

1.2. surface quality:

1.2.1. the anti-fingerprint stainless steel decorative plate has a film coating thickness of 0.0015 mm-0.0035 mm, a coated surface is clear with substantially consistent color and luster, and no visible difference is observed;

1.2.2. the surface of the anti-fingerprint stainless steel decorative plate is smooth without such defects as scratches, pits, burrs, oil stains and fingerprints;

1.2.3. the anti-fingerprint surface has less than one visible pinhole or particle within each 10 mm$^2$; and 1.2.4. no visible stripping shall be observed beyond 1 mm from the edge of the anti-fingerprint plate;

1.3. size deviation: the size deviation of length and width is 0.05 mm;

1.4. the physical and chemical properties of the anti-fingerprint plate:

1.4.1. binding strength: the surface is covered with a tape and then torn, which is repeated for 100 times, and the surface is not detached;

1.4.2. hardness: the surface is scratched with a hardness pencil (2H) without stripping;

1.4.3. warm water resistance: the anti-fingerprint plate is placed in warm water at 70° C. and taken out after 4 hours, and the surface does not change;

1.4.4. acid resistance: the surface state has no change after the anti-fingerprint plate is placed in a 10% acetate solution for 5 hours; and 1.4.5. alkali resistance: the surface has ▸ E not more than 1.0 and no bubble after the anti-fingerprint plate is placed in a 5% sodium hydroxide solution for 20 min; and 1.5. salt fog test: the rust creepage of a cross-cut edge shall not exceed 2 mm at 35° C. within 60 hours in a 5% salt fog state; and the invention can directly improve the quality of products in downstream industries, especially appliance and kitchenware products such that the products of domestic appliances and kitchenware reach the advanced level of similar foreign products.

IV. DETAILED DESCRIPTION OF THE INVENTION

Selection and formulation of a coating film: our nano-coating film of the applicant typically can be adopted (ref: CN201210063840.3), wherein the nano-coating film is a polymer coating material formed by mixing acrylic resin, a film forming material, an inorganic nano-filler, a solvent and an auxiliary agent; the film forming material comprises amino resin and epoxy resin, and comprises the following ingredients based on the weight ratio: 30-50 parts of acrylate composite resin, 5-20 parts of amino resin, 5-15 parts of epoxy resin, 1-5 parts of an inorganic nano-filler, 40-50 parts of a solvent and 10-20 parts of an auxiliary agent; and 1-8 parts of a matting agent is added, and matte anti-fingerprint coating prepared from adjuvants such as US GRACE series matting powder and anti-settling agents can be used as a coating material for the anti-fingerprint stainless steel decorative plate.

This is for the purpose of ensuring a uniform product coating, and particularly, the pH value at which a film coating solution is formulated is controlled at about 4.8.

Thickness control of the coating film during coating: the thickness of the nano-coating film of the matte anti-fingerprint stainless steel decorative plate is only 1.5-2.5 µm, a coated surface is not allowed to have visible pinholes such that the precision of the atomization air pressure of a spray gun is controlled at ±0.1 bar, and the spray coating index of the spray gun is strictly controlled by a digital pressure control device. The dispersion uniformity of the matting agent in the coating, the baking temperature, the baking time as well as the thickness and uniformity of a nano-coating are controlled to eliminate the color difference of the surface.

Pretreatment on the stainless steel decorative plate: before the stainless steel decorative plate is applied with the nano-coating film, its metal surface needs to be dry and free of dust, oil stains, grease and water spots. The surface is washed by a neutral detergent, subjected to ultrasonic rinsing with deionized water, dried with hot air in a clean environment and then applied with the nano-coating film such that the surface quality meets high-standard technical requirements.

In a drying process after the nano-coating film is applied, the stainless steel decorative plate applied with the nano-coating film needs to be dried. In order that the drying process meets process requirements, a numerical control high-temperature oven is manufactured, and the oven is placed in a clean environment during a production process, but the surface quality of the dried product cannot meet technical requirements. After the oven is detected, its purification degree is up to standard (ten-thousand grade). Subsequently, the nano-coating film is subjected to small-sample testing to show that gas produced by the nano-coating film on the metal surface during heating is crystallized in an air passage of the oven, and the aggregated gas is scattered on the surface of the anti-fingerprint stainless steel decorative plate in an irregular tiny particle state. After study, the oven is modified, i.e. a high temperature-resistant high-efficiency filter is additionally arranged at an air inlet and an air outlet of the air passage of the oven, for example, a filtering material is a filtering material coated with microporous fluorine resin, good product can be obtained.

What is claimed is:

1. A method for preparing a matte anti-fingerprint stainless steel decorative plate, comprising:
    1) selecting a polymer coating material, wherein the polymer coating material is formed by mixing the following ingredients in weight ratio:
        a film forming material, comprising 30-50 parts of acrylate composite resin, 5-20 parts of amino resin, and 5-15 parts of epoxy resin;
        an inorganic nano-filler, in 1-5 parts;
        a solvent, in 40-50 parts;
        an auxiliary agent, in 10-20 parts;
        1-8 parts of a matting agent; and
        1-8 parts of an anti-settling agent;
        wherein the polymer coating material has a PH value at about 4.8 to ensure film uniformity;
    2) performing a spray coating using the polymer coating material to form a coating film, wherein the coating film has a thickness of 1.5-2.5 µm, and a precision of the atomization air pressure of a spray gun is controlled at ±0.1 bar during the spray coating; and
    drying the coating to obtain a finished product.

2. The method according to claim 1, further comprising:
    pretreating before the spray coating step by washing the stainless steel plate by a neutral detergent, and rinsing the stainless steel plate with deionized water using ultrasonic wash.

3. The method according to claim 1, wherein the drying step further comprises
    drying the stainless steel plate in a drying oven placed in a clean environment, wherein the oven is equipped with high temperature-resistant high-efficiency filter at an air inlet and an air outlet of the air passage of the oven, the filter has a filtering material coated with microporous fluorine resin.

* * * * *